United States Patent
Malone et al.

(10) Patent No.: US 10,336,335 B2
(45) Date of Patent: Jul. 2, 2019

(54) SYSTEM AND METHOD OF AUTOMATIC APPLICATION OF ELECTRONIC PARK BRAKE

(71) Applicant: FORD GLOBAL TECHNOLOGIES, LLC, Dearborn, MI (US)

(72) Inventors: Jeffery Allen Malone, Grand Blanc, MI (US); Jacob Martin Povirk, Franklin, MI (US); Kenneth Gerard Walega, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 315 days.

(21) Appl. No.: 15/299,747

(22) Filed: Oct. 21, 2016

(65) Prior Publication Data
US 2018/0111622 A1    Apr. 26, 2018

(51) Int. Cl.
*B60W 10/10* (2012.01)
*B60W 10/18* (2012.01)
*B60W 30/18* (2012.01)
*B60T 13/74* (2006.01)
*B60T 8/172* (2006.01)
*B60W 10/196* (2012.01)
*B60T 7/12* (2006.01)

(52) U.S. Cl.
CPC ......... *B60W 30/18136* (2013.01); *B60T 7/12* (2013.01); *B60T 8/172* (2013.01); *B60T 13/74* (2013.01); *B60W 10/10* (2013.01); *B60W 10/196* (2013.01); *B60T 2270/416* (2013.01); *B60W 2520/10* (2013.01)

(58) Field of Classification Search
CPC .............. B60W 10/10; B60W 10/182; B60W 2520/10; B60T 7/12
See application file for complete search history.

(56) References Cited

U.S. PATENT DOCUMENTS

| | | | |
|---|---|---|---|
| 7,699,751 B2 | 4/2010 | Barber et al. | |
| 9,187,068 B2 | 11/2015 | Vernacchia et al. | |
| 9,233,666 B2 | 1/2016 | Al-Regib et al. | |
| 2013/0252784 A1* | 9/2013 | Kinoshita | B60W 10/182 477/92 |
| 2013/0317720 A1* | 11/2013 | Kaita | F16H 61/12 701/99 |
| 2015/0258971 A1* | 9/2015 | Hong | B60W 10/182 701/70 |

FOREIGN PATENT DOCUMENTS

FR     2 981 900 A1    5/2013
GB     2 437 091 A     10/2007

\* cited by examiner

*Primary Examiner* — Edwin A Young
(74) *Attorney, Agent, or Firm* — David B. Kelley; Brooks Kushman P.C.

(57) ABSTRACT

A vehicle includes a transmission mechanical park system, an electronic park brake, and at least one controller. The at least one controller is programmed to in response to (i) a speed difference of a measured speed and an expected speed of a downstream component of the vehicle that transmits torque downstream of the transmission mechanical park system exceeding a calibratable threshold and (ii) an ignition state of OFF, apply the electronic park brake to restrain movement of the vehicle.

20 Claims, 3 Drawing Sheets

SYSTEM AND METHOD OF AUTOMATIC APPLICATION OF ELECTRONIC PARK BRAKE

TECHNICAL FIELD

This disclosure relates to the field of controlling vehicles. More particularly, the disclosure relates to a control strategy for application of an electronic park brake.

BACKGROUND

Drivers of passenger cars equipped with an automatic transmission typically control the operation of transmission via a control device. The transmission control device is used to select several ranges, such as Park, wherein the transmission is locked to prevent the vehicle from moving, Neutral, wherein the transmission allows the vehicle to be moved freely, such as when being towed, Reverse, wherein the transmission allows the vehicle to move backwards, and one or more Drive ranges that enable forward motion of the vehicle. Usually, the transmission control device is in the form of a lever connected mechanically, such as via a cable, to the transmission. Typically, the lever is also mechanically connected to an indicator. The mechanical connection between the control device and the transmission is not impacted by whether or not the engine is running or whether electronic components in the vehicle are powered.

In a shift-by-wire transmission arrangement, the mechanical connection between the transmission control device and the transmission is eliminated. Instead, the transmission control device is configured to transmit an electrical signal to an electronic controller. The controller electronically directs actuators to provide the transmission behavior associated with the selected range. The actuators may be motors that rotate when provided with electrical current, solenoids that regulate a hydraulic pressure in response to changes in an electrical current, or other devices that respond to electrical current or voltage. The gear shift module is not necessarily in the form of a lever because the control device is no longer moving a mechanical connection for controlling the transmission. Instead, the control device may be an electro-mechanical interface (e.g., a series of buttons, lever or knob) that is used to instruct the transmission to switch between transmission ranges.

When the Park range is selected, the transmission output shaft is held against rotation to prevent vehicle movement. The Park range may remain selected for long periods of time during which the operator typically leaves the vehicle unattended. During these periods, the engine and most electrical components are off. Therefore, the Park function of preventing vehicle movement must be maintained independent of the state of the engine or the vehicle electrical system.

Vehicles may also include electronic park brakes which engage the wheel brakes. Electronic park brakes may serve as a countermeasure to potential failure modes that may prevent the transmission mechanical park brake from successfully restraining the vehicle from movement.

SUMMARY

According to one embodiment, a vehicle includes a transmission mechanical park system, an electronic park brake, and at least one controller. The at least one controller is programmed to in response to (i) a speed difference of a measured speed and an expected speed of a downstream component of the vehicle that transmits torque downstream of the transmission mechanical park system exceeding a calibratable threshold and (ii) an ignition state of OFF, apply the electronic park brake to restrain movement of the vehicle.

According another embodiment, a vehicle includes a transmission mechanical park system, an electronic park brake, and at least one controller. The at least one controller is programmed to in response to a measured speed of a downstream component of the vehicle that transmits torque downstream of the transmission mechanical park system being less than an expected speed of the downstream component by a calibratable threshold, apply the electronic park brake to restrain movement of the vehicle in response to a selection of park.

According to another embodiment, a vehicle includes a transmission mechanical park system, an electronic park brake, and at least one controller. The at least one controller is programmed to in response to (i) engagement of the transmission mechanical park system, (ii) an ignition state of OFF, and (iii) a speed difference of a measured speed and an expected speed of a downstream component that transmits torque downstream of the transmission mechanical park system exceeding a calibratable threshold, apply the electronic park brake to restrain movement of the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
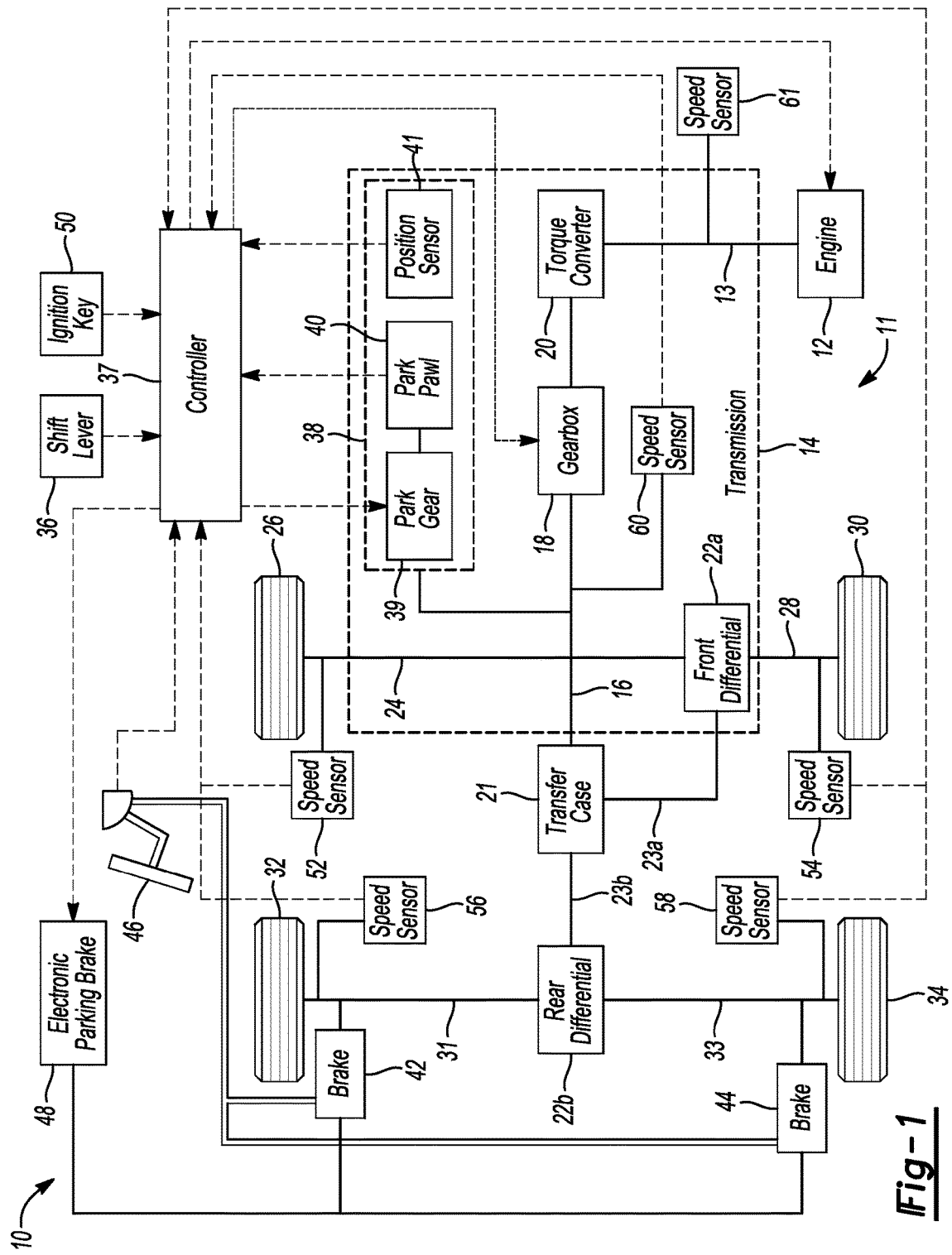
FIG. 1 is schematic diagram of a shift-by-wire vehicle powertrain and a braking system.

FIG. 1 schematically illustrates a vehicle 10 with a powertrain 11. Mechanical connections are illustrated by single solid lines. Hydraulic connections are illustrated by double solid lines. Dashed lines represent the control signals. Although powertrain 11 is illustrated as being four wheel drive, the instant disclosure may apply to any powertrain (for example and without limitation, front wheel drive, rear wheel drive, or all wheel drive). Engine 12 converts chemical energy in fuel to mechanical power at crankshaft 13. Transmission 14 transmits the power from crankshaft 13 to transmission output shaft 16. Transmission output shaft 16 rotates at a speed proportional to vehicle speed which may differ significantly from the speed at which the engine can efficiently produce the power. Transmission 14 accommodates these requirements. At low vehicle speed, transmission 14 reduces the speed and multiplies the torque for improved performance. At high vehicle speed, transmission 14 permits the engine to operate at a lower speed for quite, fuel efficient cruising. Transmission 14 includes a gearbox 18 which establishes a variety of forward speed ratios and at least one reverse speed ratio. Transmission 14 also includes a launch device such as torque converter 20 capable of transmitting torque when the driveshaft is stationary in order to start the vehicle moving. Vehicle 10 may also include a transfer case 21 configured to distribute power from transmission 14 to the front and rear axles via a front differential 22a and a rear differential 22b. Front differential 22a divides the power received from a front driveshaft 23a (coupled to transfer case 21) between a front left axle shaft 24 driving a front left wheel 26 and a front right axle shaft 28 driving a front right wheel 30. Rear differential 22b divides the power received from a rear driveshaft 23b (coupled to transfer case 21) between a rear left axle shaft 31 driving a rear left wheel 32 and a rear right axle shaft 33 driving a rear right wheel 34. Axle shafts 24, 28, 31, 33 may be referred to as "half-shafts" in independent suspension vehicles.

The driver controls transmission 14 by manipulating a transmission control device such as shift lever 36 to select the transmission range. When the driver selects either the Drive or Reverse range, a controller 37 commands engagement of clutches in gearbox 18 to establish a power flow path with an appropriate sped ratio. When the driver commands either the Neutral or Park ranges, controller 37 either commands no clutches to engage or fewer clutches than required to establish a power flow path. Clutches that are not commanded to engage passively release, such that no power flow path is established in Neutral and Park.

Vehicle 10 may include a transmission mechanical park system 38 configured to restrain vehicle 10 from movement when placed in Park. Transmission mechanical park system 38 may include a park gear 39, a park pawl 40, and a position sensor 41 configured to sense a position of park pawl 40. Park is implemented by park gear 39 fixedly coupled to the transmission output shaft 16 and park pawl 40. Controller 37 commands park pawl 40 to move into one of two positions. When the shift lever 36 is in any position other than Park, controller 37 commands park pawl 40 to a non-Park position in which it does not engage with park gear 39, and output shaft 16 is free to rotate. In a Park position, park pawl 40 engages park gear 39 holding output shaft 16 against rotation. As long as the downstream components of the powertrain 11 are intact and the wheels have traction, holding the transmission output shaft 16 stationary holds the vehicle 10 stationary. If a component(s) downstream of transmission mechanical park system 38 in the park load reaction path (from the transmission mechanical park system 38 to wheels 26, 30, 32, 34) fails to support the load required to keep the vehicle 10 stationary while in Park, the vehicle 10 may move while in Park. Such downstream components may be a driveshaft, a half-shaft, a wheel, a differential, a chain, a sprocket, a transmission gear, a hub or bearing, a transmission flange or shaft, or any component that transfers torque between the park system and ground. If output shaft 16 is rotating above a ratchet speed when park pawl 40 is moved to the Park position, park pawl 40 does not immediately engage park gear 39 but instead bounces off the park gear 39, called ratcheting, until the vehicle 10 slows enough that the park pawl 40 drops into engagement. This feature prevents sudden stopping of the output shaft 16 at high vehicle speed if a driver accidentally moves the shift lever 36 to Park. Position sensor 41 indicates to the controller which of the two positions park pawl 40 is presently in, permitting controller 37 to verify that the pawl 40 has moved as commanded. Park pawl 40 is designed to remain in its present position in the absence of commands from controller 37.

The vehicle 10 also includes rear brakes 42 and 44 to slow left axle 31 and right axle 33, respectively. These are hydraulically actuated by depressing brake pedal 46. Finally, the vehicle 10 includes an electronic park brake (EPB) 48. The EPB is mechanically connected to both brake 42 and 44 and engages both wheel brakes 42, 44 in response to a signal from controller 37, independently of the position of brake pedal 46. Although electrical power is required to apply the EPB 48, the EPB 48 is designed to remain in the applied position restraining the rear wheels 32, 34 from rotation without electrical power. The driver can command either application or release of EPB 48. However, in some embodiments, controller 37 may not be configured to command release of the EPB 48. Normally, the controller 37 is powered on when ignition key 50 is turned to an ON position and powered off when the ignition key is turned to an OFF position. However, the controller can delay the shutdown process in some circumstances.

In some embodiments, vehicle 10 may include speed sensors 52, 54, 56, 58, 60, 61. Speed sensor 52 may be coupled to front left axle shaft 24 proximate front left wheel 26 and be configured to measure the speed of front left axle shaft 24; speed sensor 54 may be coupled to front right axle shaft 28 proximate front right wheel 30 and be configured to measure the speed of front left axle shaft 24; speed sensor 56 may be coupled to rear left axle shaft 31 proximate rear left wheel 32 and be configured to measure the speed of rear left axle shaft 31; and speed sensor 58 may be coupled to rear right axle shaft 33 proximate rear right wheel 34 and be configured to measure the speed of rear right axle shaft 33. Speed sensor 60 may be coupled to transmission output shaft 16 and be configured to measure the speed of transmission output shaft 16. Speed sensor 61 may be coupled to crankshaft 13 and be configured to measure the speed of crankshaft 13. One of ordinary skill in the art will understand that other sensors may be used to measure the speed of various components of powertrain 11. As will be described in more detail below, speed sensors 52, 54, 56, 58, 60 (or other sensors not specifically illustrated) may be utilized in a method for automatically applying EPB 48.

Figure 2:
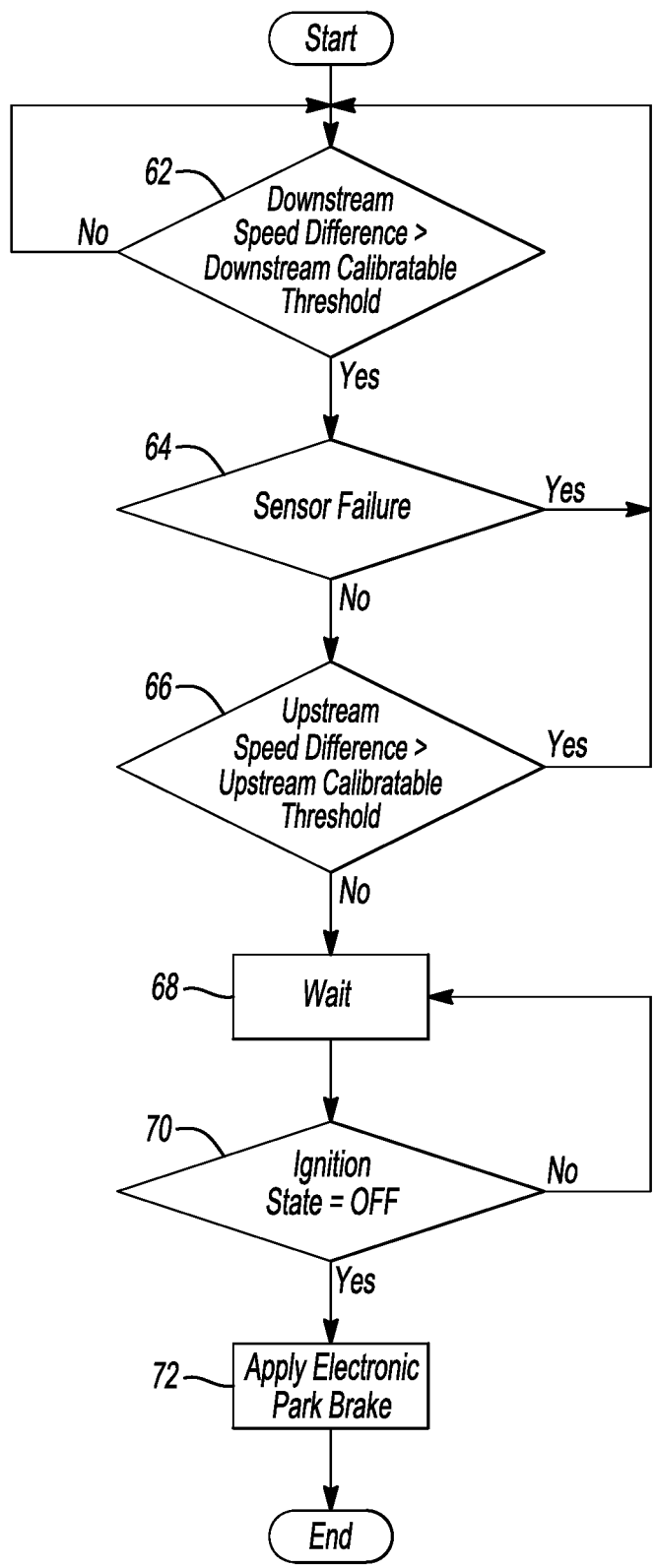
FIG. 2 is a flowchart for a method of automatically applying an electronic park brake in accordance with an embodiment of the present disclosure.

FIG. 2 is a flowchart for a method of automatically applying electronic park brake in accordance with an embodiment of the present disclosure. The method may begin with the step 62 of determining whether a downstream speed difference of a measured speed and an expected speed of a downstream component of vehicle 10 that transmits torque downstream of transmission mechanical park system 38 exceeds a downstream calibratable threshold. In some embodiments, the monitored downstream component may be a component that transmits or holds a torque transmitted from transmission 14 to wheels 26, 30, 32, 34. In one embodiment, the downstream component may be disposed within transmission 14 (for example and without limitation, transmission output shaft 16). In another embodiment, the downstream component may be front axle shaft 24 or 28. In yet another embodiment, the downstream component may be rear axle shaft 31 or 33. One of ordinary skill in the art will understand that the monitored downstream component may be various components within vehicle 10 such that a speed difference of the monitored downstream component exceeding a downstream calibratable threshold may indicate a potential failure of the vehicle 10 to remain stationary while in Park. Furthermore, speed differences among multiple components may be monitored and compared to their respective calibratable thresholds within the spirit and scope of this disclosure. For simplicity, the below discussion assumes that the monitored downstream component is front left axle shaft 24 with sensor 52 measuring the speed thereof.

The downstream speed difference may be determined according to the following equation:

$$\text{speed difference} = |(\text{expected speed}) - (\text{measured speed})|$$

In an embodiment, controller 37 determines the expected speed of axle shaft 24 (according to a pre-programmed algorithm, for example) and receives a signal from sensor 52 indicating the measured speed of axle shaft 24. Controller 37 may be programmed to determine the downstream speed difference according to the above equation and compare it to a downstream calibratable threshold. In one embodiment, the downstream calibratable threshold may be defined by a margin of error associated with speed sensor 52. Different sensors may have different margins of error due to the quality of the sensor, measurement noise, and the current gear at the time of measurement. The calibratable thresholds may vary by vehicle and be determined according to an algorithm and/or stored in a look-up table. Controller 37 may be programmed to retrieve the appropriate calibratable threshold when performing step 62. The calibratable threshold may depend on the architecture of the vehicle and how far downstream the respective sensor is positioned from the transmission mechanical park system 38. For example and without limitation, in one embodiment, the calibratable threshold associated with sensor 60 (disposed proximate transmission mechanical park system 38) may be in the range of 0.25% to 1%, and the calibratable threshold associated with sensor 56 (proximate wheel 32) may be in the range of 2-20%. Moreover, in some embodiments, the calibratable threshold may be a function of member rotational speed, and sensor accuracy may also vary with expected speed. For example and without limitation, the calibratable threshold for relatively lower expected speeds may be lower than the calibratable threshold for relatively higher expected speeds (for the same sensor).

In another embodiment, rather than comparing the absolute value of the downstream speed difference with the downstream calibratable threshold as shown in the above equation, step 62 may be determining whether a measured speed of the downstream component is less than an expected speed of the downstream component by a calibratable threshold (while the vehicle 10 is moving).

If at step 62 controller 37 determines that the downstream speed difference does not exceed the downstream calibratable threshold, the method may continue monitoring the downstream speed difference. If at step 62 controller 37 determines that the downstream speed difference does exceed the downstream calibratable threshold, the method may continue with the step 64 of determining whether there is a failure of the sensor that detected the downstream speed difference (exceeding the downstream calibratable threshold). One of ordinary skill in the art will understand how controller 37 may detect a sensor failure. Furthermore, a sensor failure may include an absolute failure of the sensor, loss of signal, or sensor degradation (among other failures not explicitly listed). The sensor failure may include any circumstances associated with the sensor that will result in the sensor not operating within its intended capabilities. If at step 64 controller 37 determines that there is a failure of the sensor, the method may return to step 62 of monitoring the downstream speed difference.

If at step 64 controller 37 determines there is no failure of the respective sensor, the method may continue with the step 66 of determining whether an upstream speed difference associated with an upstream component of vehicle 10 upstream of the transmission mechanical park system 38 exceeds an upstream calibratable threshold. The upstream component may be any component configured to transmit or hold a torque from the engine 12 to the transmission 14 upstream of transmission mechanical park system 38. For example and without limitation, the upstream component may be disposed within gearbox 18 or torque converter 20. In one embodiment, the upstream component may be crankshaft 13 and sensor 61 may measure the speed of crankshaft 13 (FIG. 1). One of ordinary skill in the art will understand that the monitored upstream component may be various components within vehicle 10. Furthermore, upstream speed differences among multiple upstream components may be monitored and compared to their respective calibratable thresholds within the spirit and scope of this disclosure. For simplicity, the below discussion assumes that the monitored upstream component is crankshaft 13 with sensor 61 measuring the speed thereof.

The upstream speed difference may be determined according to the above equation. In an embodiment, controller 37 determines the expected speed of crankshaft 13 (according to a pre-programmed algorithm, for example) and receives a signal from sensor 61 indicating the measured speed of crankshaft 13. Controller 37 may be programmed to determine the upstream speed difference according to the above equation and compare it to an upstream calibratable threshold. Controller 37 may be further programmed to retrieve the appropriate calibratable threshold when performing step 64. In one embodiment, the upstream calibratable threshold may be defined by a margin of error associated with speed sensor 61. Different sensors may have different margins of error due to the quality of the sensor, measurement noise, and the current gear at the time of measurement. The calibratable thresholds may vary by vehicle and be determined according to an algorithm and/or stored in a look-up table. The upstream calibratable threshold may depend on the architecture of the vehicle. For example and without limitation, in one embodiment, the calibratable threshold may be in the range of 1-15%. Moreover, in some embodiments, the calibratable threshold may also vary with expected speed. For example and without limitation, the calibratable threshold for relatively lower expected speeds may be lower than the calibratable threshold for relatively higher expected speeds (for the same sensor).

If at step 66 controller 37 determines that the upstream speed difference exceeds the upstream calibratable threshold, the method may return to step 62 and continue to monitor the downstream speed difference. In such a case, the upstream speed difference, which may indicate an inability of the crankshaft 13 to effectively transmit torque from the engine 12 to the transmission 14, may affect the downstream speed difference (determined in step 62) and, therefore, the downstream speed difference exceeding the downstream calibratable threshold may not be indicative of a potential failure of the vehicle 10 to remain stationary while in Park. In one embodiment, controller 37 is programmed to inhibit automatic application of the EPB 48 in response to an indication of a failure of the upstream sensor. A sensor failure may include an absolute failure of the sensor, loss of signal, or sensor degradation (among other failures not explicitly listed). The sensor failure may include any circumstances associated with the sensor that will result in the sensor not operating within its intended capabilities. Although steps 62, 64, and 66 are illustrated as being performed sequentially and in that order, one of ordinary skill in the art will understand that these steps can be performed in a different order (relative to each other or the entire method of FIG. 2) or in parallel. In some embodiments, step 66 is optional. The method may include an additional step (not illustrated) of determining whether there is a failure of the respective speed sensor, similar to step 64 with respect to the downstream speed difference.

If at step 66 controller 37 determines that the upstream speed difference does not exceed the upstream calibratable threshold, the method may continue with the step 68 of waiting until the ignition state of ignition key 50 is OFF. Once the ignition state is OFF at step 70, the method may continue with the step 72 of automatically applying the EPB 48. An advantage of the disclosed method of FIG. 2 is that the downstream speed difference may be detected while the vehicle is 10 being driven, therefore, allowing a proactive detection of a potential failure of the vehicle 10 to remain stationary when the vehicle 10 is subsequently placed in Park. As such, in one embodiment, the controller 37 is programmed to in response to the downstream speed difference exceeding the downstream calibratable threshold and a subsequent ignition state of OFF, apply the EPB 48 to restrain movement of the vehicle 10. In another embodiment, the downstream speed difference (exceeding the downstream calibratable threshold) may be detected when the vehicle 10 is already placed in Park, perhaps before the ignition state is OFF. In such a case, because the expected speed may be zero, the calibratable threshold may also be zero, and a measured speed exceeding the calibratable threshold of zero would result in the condition of step 66 being met. Lastly, in one embodiment, the ignition state being OFF in step 70 may also infer that the vehicle 10 is in Park (i.e., that the driver engaged the transmission mechanical park system 38). As such, the controller 37 may be programmed to in response to engagement of the transmission mechanical park system 38, an ignition state of OFF, and the downstream speed difference exceeding the downstream calibratable threshold, apply the EPB 48 to restrain movement of the vehicle 10.

Figure 3:
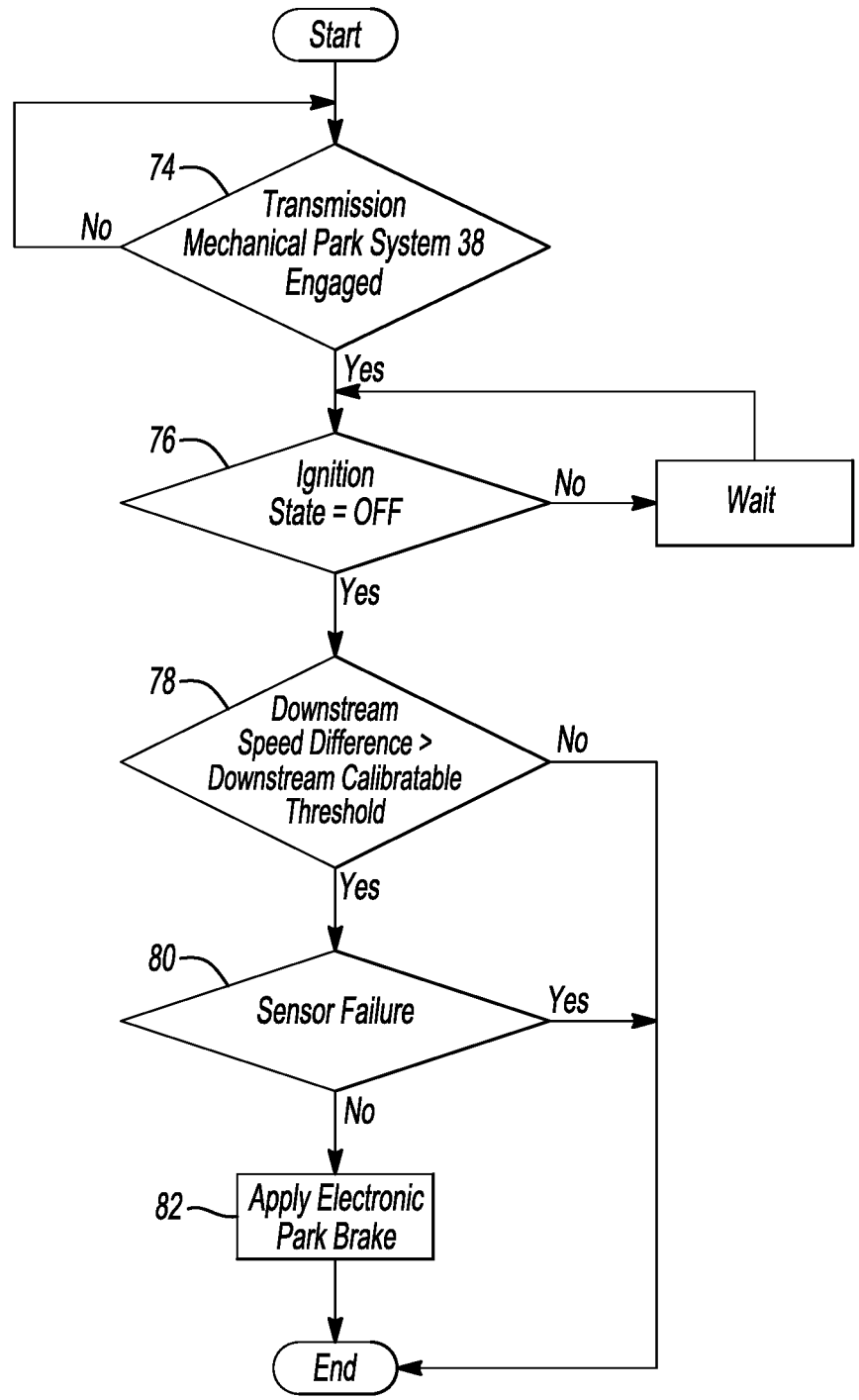
FIG. 3 is a flowchart for a method of automatically applying an electronic park brake in accordance with another embodiment of the present disclosure.

FIG. 3 is a flowchart for a method of automatically applying electronic park brake 48 in accordance with another embodiment of the present disclosure. The method may begin with the step 74 of determining whether the transmission mechanical park system 38 is engaged (i.e., the vehicle 10 is placed in Park). Once the transmission mechanical park system 38 is engaged, the method may continue with the step 76 of determining whether the ignition state of the ignition key 50 is OFF. This step may be implemented to infer the driver's intent of keeping the vehicle 10 stationary. Once the ignition state is OFF, the method may continue with the step 78 of determining whether a downstream speed difference of a measured speed and an expected speed of a downstream component of the vehicle 10 that transmits torque downstream of the transmission mechanical park system 38 exceeds a downstream calibratable threshold. In some embodiments, the monitored downstream component may be a component that transmits or holds a torque transmitted from transmission 14 to wheels 26, 30, 32, 34. In one embodiment, the downstream component may be disposed within transmission 14 (for example and without limitation, transmission output shaft 16). In another embodiment, the downstream component may be front axle shaft 24 or 28. In yet another embodiment, the downstream component may be rear axle shaft 31 or 33. One of ordinary skill in the art will understand that the monitored downstream component may be various components within vehicle 10 such that a speed difference of the monitored downstream component exceeding a downstream calibratable threshold may indicate a failure of the vehicle 10 to remain stationary while in Park. Furthermore, speed differences among multiple components may be monitored and compared to their respective calibratable thresholds within the spirit and scope of this disclosure. For simplicity, the below discussion assumes that the monitored downstream component is front left axle shaft 24 with sensor 52 measuring the speed thereof.

The downstream speed difference may be determined according to the following equation:

$$\text{speed difference} = |(\text{expected speed}) - (\text{measured speed})|$$

In the illustrated embodiment, controller 37 may set the expected speed of axle shaft 24 as zero (since the vehicle 10 is in Park). The controller 37 may receive a signal from sensor 52 indicating the measured speed of axle shaft 24. Controller 37 may be programmed to determine the downstream speed difference according to the above equation and compare it to a downstream calibratable threshold. Controller 37 may be programmed to retrieve the appropriate calibratable threshold when performing step 62. In one embodiment, the downstream calibratable threshold may be defined by a margin of error associated with speed sensor 52. Different sensors may have different margins of error due to the quality of the sensor, measurement noise, and the current gear at the time of measurement. The calibratable thresholds may vary by vehicle and be determined according to an algorithm and/or stored in a look-up table. In the illustrated embodiment, the downstream calibratable threshold may be zero since the expected speed may be zero.

If at step 78, controller 37 determines that the downstream speed difference does not exceed the calibratable threshold, then the vehicle 10 may be presumed to be secure with engagement of the transmission mechanical park system 38 only. If at step 78 controller 37 determines that the downstream speed difference does exceed the downstream calibratable threshold, the method may continue with the step 80 of determining whether there is a failure of the sensor that detected the downstream speed difference (exceeding the downstream calibratable threshold). One of ordinary skill in the art will understand how controller 37 may detect a sensor failure. Furthermore, a sensor failure may include an absolute failure of the sensor, loss of signal, or sensor degradation (among other failures not explicitly listed). The sensor failure may include any circumstances associated with the sensor that will result in the sensor not operating within its intended capabilities. If at step 80 controller 37 determines that there is a failure of the sensor, then controller 37 may inhibit automatic application of the EPB 48. If at step 80 controller 37 determines that there is no failure of the sensor, the method may continue with the step 82 of applying the EPB 48 to restrain movement of the vehicle 10. One of ordinary skill in the art will understand that steps 74, 76, 78, and 80 may be performed in a different order than the order illustrated in FIG. 3. Furthermore, step 80 may be optional in accordance with some embodiments.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A vehicle comprising:
a transmission mechanical park system;
an electronic park brake; and
at least one controller programmed to in response to (i) a speed difference of a measured speed and an expected speed of a downstream component of the vehicle that transmits torque downstream of the transmission mechanical park system exceeding a calibratable threshold and (ii) an ignition state of OFF, apply the electronic park brake to restrain movement of the vehicle.

2. The vehicle of claim 1, wherein the ignition state of OFF is subsequent to the speed difference exceeding the calibratable threshold.

3. The vehicle of claim 1, wherein the calibratable threshold is defined by a margin of error associated with a speed sensor that senses the measured speed of the downstream component.

4. The vehicle of claim 3, wherein the at least one controller is further programmed to inhibit automatic application of the electronic park brake in response to an indication of a failure of the speed sensor.

5. The vehicle of claim 1, further comprising a transmission and wheels, wherein the downstream component transmits or holds a torque transmitted from the transmission to the wheels.

6. The vehicle of claim 5, wherein the downstream component is disposed within the transmission.

7. The vehicle of claim 5, further comprising a front axle shaft, wherein the downstream component is the front axle shaft.

8. The vehicle of claim 5, further comprising a rear axle shaft, wherein the downstream component is the rear axle shaft.

9. The vehicle of claim 1, wherein the at least one controller is further programmed to inhibit automatic application of the electronic park brake in response to an upstream speed difference associated with an upstream component of the vehicle upstream of the transmission mechanical park system exceeding an upstream calibratable threshold.

10. A vehicle comprising:
a transmission mechanical park system;
an electronic park brake; and
at least one controller programmed to in response to a measured speed of a downstream component of the vehicle that transmits torque downstream of the transmission mechanical park system being less than an expected speed of the downstream component by a calibratable threshold, apply the electronic park brake to restrain movement of the vehicle in response to a selection of park.

11. The vehicle of claim 10, wherein the calibratable threshold is defined by a margin of error associated with a speed sensor that senses the speed of the downstream component.

12. The vehicle of claim 11, wherein the at least one controller is further programmed to inhibit automatic application of the electronic park brake in response to an indication of a failure of the speed sensor that senses the speed of the downstream component.

13. The vehicle of claim 10, further comprising a transmission and wheels, wherein the downstream component transmits or holds a torque transmitted from the transmission to the wheels.

14. The vehicle of claim 13, wherein the downstream component is disposed within the transmission.

15. The vehicle of claim 13, further comprising a front axle shaft, wherein the downstream component is the front axle shaft.

16. The vehicle of claim 13, further comprising a rear axle shaft, wherein the downstream component is the rear axle shaft.

17. A vehicle comprising:
a mechanical park system;
an electronic park brake; and
at least one controller programmed to in response to (i) engagement of the mechanical park system, (ii) an ignition state of OFF, and (iii) a speed difference of a measured speed and an expected speed of a downstream component that transmits torque downstream of the mechanical park system exceeding a calibratable threshold, apply the electronic park brake to restrain movement of the vehicle.

18. The vehicle of claim 17, further comprising a transmission and wheels, wherein the downstream component transmits or holds a torque transmitted from the transmission to the wheels.

19. The vehicle of claim 18, further comprising a front axle shaft and a rear axle shaft, wherein the downstream component is the front axle shaft or the rear axle shaft.

20. The vehicle of claim 17, wherein the expected speed is zero.

* * * * *